(12) United States Patent
Halstead

(10) Patent No.: US 11,155,716 B2
(45) Date of Patent: Oct. 26, 2021

(54) ICEPHOBIC COATING COMPOSITION

(71) Applicant: SWIMC LLC, Cleveland, OH (US)

(72) Inventor: Joshua M Halstead, Parma, OH (US)

(73) Assignee: SWIMC LLC, Cleveland, OH (US)

( * ) Notice: Subject to any disclaimer, the term of this patent is extended or adjusted under 35 U.S.C. 154(b) by 472 days.

(21) Appl. No.: 16/022,769

(22) Filed: Jun. 29, 2018

(65) Prior Publication Data

US 2019/0002704 A1 Jan. 3, 2019

Related U.S. Application Data

(60) Provisional application No. 62/527,125, filed on Jun. 30, 2017.

(51) Int. Cl.
| | |
|---|---|
| *C09D 5/00* | (2006.01) |
| *C09K 3/18* | (2006.01) |
| *C09D 5/02* | (2006.01) |
| *C09D 119/00* | (2006.01) |
| *C09D 133/00* | (2006.01) |
| *C09D 175/04* | (2006.01) |
| *C09D 7/61* | (2018.01) |
| *C09D 7/65* | (2018.01) |

(Continued)

(52) U.S. Cl.
CPC ............. *C09D 5/00* (2013.01); *C09D 5/024* (2013.01); *C09D 119/006* (2013.01); *C09D 133/00* (2013.01); *C09D 175/04* (2013.01); *C09K 3/185* (2013.01); *C08K 3/16* (2013.01); *C08K 2003/162* (2013.01); *C09D 7/20* (2018.01); *C09D 7/61* (2018.01); *C09D 7/65* (2018.01)

(58) Field of Classification Search
None
See application file for complete search history.

(56) References Cited

U.S. PATENT DOCUMENTS

| | | | |
|---|---|---|---|
| 8,778,216 B2 | 7/2014 | Zhao et al. | |
| 2004/0036054 A1* | 2/2004 | Haslim | C09D 5/04 252/70 |

(Continued)

FOREIGN PATENT DOCUMENTS

| | | |
|---|---|---|
| CN | 1916094 | 2/2007 |
| CN | 106996065 | 8/2017 |

OTHER PUBLICATIONS

PCT International Search Report, dated Nov. 6, 2018.
PCT Written Opinion of the International Searching Authority, dated Nov. 6, 2018.

*Primary Examiner* — Shamim Ahmed
*Assistant Examiner* — Bradford M Gates
(74) *Attorney, Agent, or Firm* — Tucker Ellis LLP

(57) ABSTRACT

An icephobic coating composition forms a coating layer that melts ice and snow upon contract and remains durable after several exposures to winter storms. The icephobic coating composition includes about 2.5% to about 12.5% by weight of latex polymer solids; about 30% to about 70% by weight of an inorganic halide salt; about 15% to about 50% by weight water; and about 1% to about 15% by weight of an organic co-solvent selected from glycerin, glycols, and glycol ethers. An alternative icephobic coating composition includes about 1% to about 20% by weight of a solution polymer instead of a latex polymer, and about 10% to about 40% by weight of a VOC-exempt organic solvent instead of the foregoing water and co-solvent.

25 Claims, 3 Drawing Sheets

(51) Int. Cl.
*C09D 7/20* (2018.01)
*C08K 3/16* (2006.01)

(56) References Cited

U.S. PATENT DOCUMENTS

| | | | |
|---|---|---|---|
| 2013/0330469 A1 | 12/2013 | Ding et al. | |
| 2014/0234579 A1* | 8/2014 | Wang | B29C 48/12 428/141 |
| 2014/0272301 A1* | 9/2014 | Gross | C09D 5/00 428/149 |

* cited by examiner

ICEPHOBIC COATING COMPOSITION

RELATED APPLICATIONS

This patent application claims priority to U.S. Provisional Application Ser. No. 62/527,125, filed on Jun. 30, 2017, the disclosure of which is incorporated by reference.

FIELD OF THE INVENTION

The present invention is directed to an icephobic coating composition that has long-lasting durability when applied to driveways, walkways, truck beds, patios, decks, and other surfaces formed of concrete, asphalt, glass and wood.

BACKGROUND OF THE INVENTION

In a typical winter in mid-latitude climates, residents need to remove ice and snow from outdoor surfaces several times. In order to reduce the dangers associated with slipping and falling, it has been common practice to apply sand or granular salt to the ice-covered surfaces. Sand is effective only so long as it remains on the slippery surface, and becomes ineffective when it penetrates the ice and snow, or is covered with additional ice and snow. Granular salt depresses the freezing point of water, resulting in melting of the ice and snow. The resulting salt water is corrosive and, when it splashes, causes heavy soiling of automobiles and clothing. Because the salt quickly dilutes and/or washes away from the applied surface, it has to be re-applied every time the weather produces additional ice and snow.

As an alternative (or in addition) to applying sand or granular salt, various snow removal techniques are employed to plow, shovel or otherwise mechanically remove the snow and ice. Mechanical snow and ice removal can be labor-intensive and costly. There is a need or desire for an icephobic coating composition that melts the ice and snow as it forms or falls, does not need to be frequently applied, and eases the burden of mechanical snow and ice removal.

SUMMARY OF THE INVENTION

The present invention is directed to an icephobic coating composition that, once applied, remains durable after several exposures to snow and ice-producing storms. The coating composition melts snow and ice upon contact, and either eliminates or significantly reduces the burden associated with mechanical snow and ice removal. The icephobic coating composition includes the following ingredients in the following amounts:

about 2.5% to about 12.5% by weight of latex polymer solids;

about 30% to about 70% by weight of an inorganic halide salt;

about 15% to about 50% by weight water;

optionally, about 1% to about 15% by weight of an organic co-solvent selected from glycerin, glycols, and glycol ethers; and optionally, about 1% to about 5% by weight additives selected from defoamers and rheology modifiers.

The present invention is also directed to a method of preparing an icephobic coating layer on a surface. The surface can be asphalt, concrete, metal, glass, wood, or a composite of plastic and wood. The method includes the steps of:

providing an icephobic composition that includes about 2.5% to about 12.5% by weight of latex polymer solids, about 30% to about 70% by weight of a inorganic halide salt, about 15% to about 50% by weight water and optionally about 1% to about 15% by weight of an organic co-solvent selected from glycerin, glycols, and glycol ethers;

applying the icephobic composition to a surface; and drying the icephobic composition on the surface to form the icephobic coating layer.

In another embodiment, the invention is directed to an icephobic coating composition that includes the following ingredients in the following amounts:

about 1% to about 20% by weight of a solution polymer, suitably one that is selected from acrylics, nitrocellulose, alkyds, cellulose acetate butyrate, styrene-ethylene/butylene copolymers, polystyrene, and combinations thereof;

about 30% to about 70% by weight of an inorganic halide salt;

about 10% to about 40% by weight of a solvent selected from acetone, parachlorobenzotrifluoride, and combinations thereof; and optionally, about 0.25% to about 5% by weight additives selected from rheology modifiers.

The present invention is also directed to a corresponding method of preparing an icephobic coating layer on a surface. The method includes the steps of:

providing an icephobic composition that includes about 1% to about 20% by weight of a solid polymer, about 30% to about 70% by weight of a inorganic halide salt, and about 10% to about 40% by weight of a solvent selected from acetone, parachlorobenzotrifluoride, and combinations thereof;

applying the icephobic composition to a surface; and drying the icephobic composition on the surface to form the icephobic coating layer.

The icephobic coating composition provides a coating layer that melts snow and ice upon contact, eliminates or diminishes the burden of mechanically removing snow and ice, and remains durable through several snow and ice-producing storms. The icephobic coating composition is easy to apply and does not require frequent re-application.

DETAILED DESCRIPTION OF THE INVENTION

Figure 1:
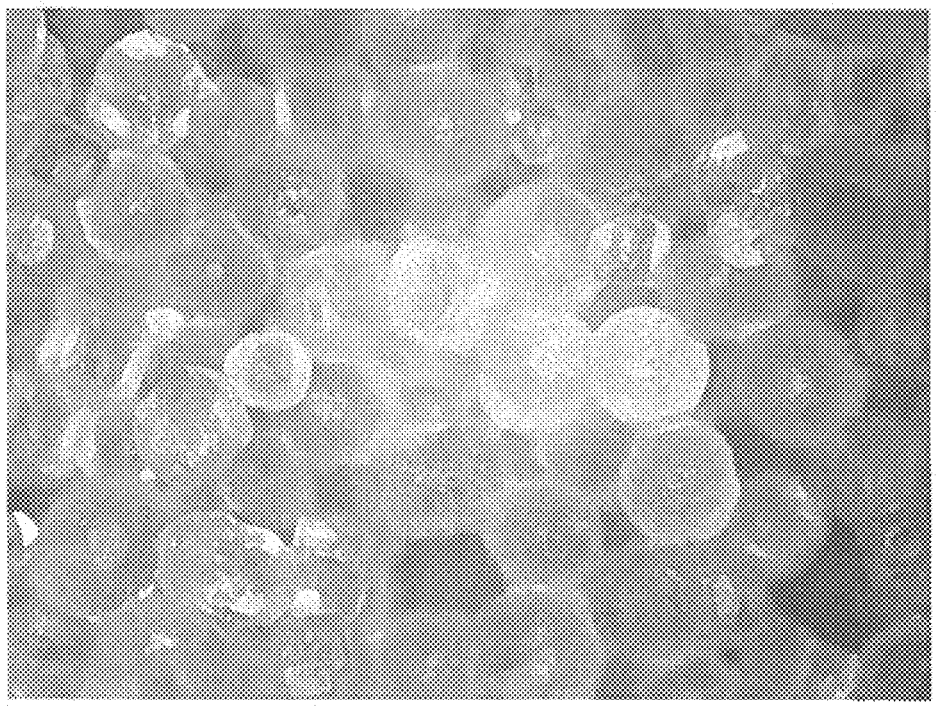
FIG. 1 is a photomicrograph of an icephobic coating composition of the invention, applied to a concrete surface and dried (100× magnification).

In one embodiment of the invention, an icephobic coating composition is provided that can be applied to a surface of cement, asphalt, wood, glass, wood/plastic composite, or metal, and dried to form an icephobic coating layer. The icephobic coating composition includes about 2.5% to about 12.5% by weight of latex polymer solids. A latex is a stable dispersion (emulsion or colloidal dispersion) of polymer micro-particles in an aqueous medium. Suitable latex polymers include natural latex polymers and synthetic latex polymers Natural latex polymers are found in nature and include polymers of isoprene. Isoprene polymers are often referred to as natural rubber due to their elastomeric nature. The most common natural latex polymer is cis-1,4-polyisoprene, typically having a molecular weight of 100,000 to 1 million Daltons. Another natural latex polymer is trans-1,4-polyisoprene, a structural isomer having similar properties. Polyisoprene latex polymers can also be synthesized, and such polymers are referred to as "synthetic natural latex polymers."

Synthetic latex polymers can be made by polymerizing certain monomers to form micro-particles that are emulsified, sometimes with the aid of surfactants, in water and/or organic solvents. Examples of synthetic latex polymers include without limitation some grades of acrylic polymers, polybutadienes, styrene-butadiene copolymers, polyvinyl acetate, vinyl copolymers, polyurethanes, polychloroprenes, polystyrenes, and polyacrylates. Of the foregoing polymers, only those grades that exist as a stable emulsion of micro-particles are considered latex polymers.

The above-stated range of about 2.5% to about 12.5% by weight of latex polymer solids refers to the dry weight of latex polymer micro-particles that exist in an emulsion or colloidal dispersion. The icephobic coating composition may contain about 5% to about 25% by weight of the latex polymer dispersion, inclusive of the liquid component(s). Suitably, the icephobic coating composition includes about 5% to about 10% by weight of the latex polymer solids, or about 10% to about 20% by weight of the latex polymer dispersion. As noted above, the term "latex polymer" does not include all grades of the listed polymers, but instead includes only those grades having a molecular weight and particle size that can form a stable emulsion or colloidal dispersion.

The icephobic coating composition includes about 15% to about 50% by weight water, suitably about 20% to about 40% by weight water. The stated amount of water includes both the water component of the latex polymer emulsion, and any added water.

The icephobic coating composition includes about 30% to about 70% by weight of an inorganic halide salt, suitably about 40% to about 60% of an inorganic halide salt. Suitable inorganic halide salts include without limitation inorganic salts of sodium, potassium, magnesium and calcium, which are useful due to their ice melting properties, bulk availability, and relatively low cost. Specific examples include without limitation sodium chloride, calcium chloride, potassium chloride, magnesium chloride, and combinations thereof. Even more suitably, the inorganic halide salt is non-hygroscopic. Examples of non-hygroscopic inorganic halide salts include sodium chloride and potassium chloride. When mixed with water alone, sodium chloride melts ice down to about 20° F.; potassium chloride down to about 12° F., magnesium chloride down to about 5° F., and calcium chloride down to about −25° F. The inorganic halide salt is typically partially dissolved in the icephobic coating composition.

The icephobic coating composition can include about 1% to about 15% by weight of an organic co-solvent, suitably about 2% to about 10% by weight. The organic co-solvent can be selected from glycerin, glycols and glycol ethers. Suitable glycols include without limitation ethylene glycol, propylene glycol, butylene glycol, and combinations thereof. Suitable glycol ethers include without limitation alkyl ethers of ethylene glycol, propylene glycol, butylene glycol, and combinations thereof. These organic co-solvents possess antifreeze properties when mixed with water in the stated amounts, and aid in the coalescence of the latex polymer solids.

The icephobic coating composition may optionally contain about 1% to about 15% by weight additives selected from defoamers and rheology modifiers. The term "defoamer" refers to a wide variety of chemical additives that reduce or hinder the formation of foam before, during and after application of the icephobic coating composition. Suitable defoamers include without limitation BYK-024, available from BYK Additives and Instruments; TEGO® Airex 900, available from Evonik Resource Efficiency GmbH; Sherdefoam®, available from the Sherwin-Williams Company; and combinations thereof. The term "rheology modifier" refers to a wide variety of chemical additives that help to regulate the viscosity of the icephobic coating composition and maintain the ingredients in uniform suspension. Suitable rheology modifiers include without limitation hydroxyethylcellulose, such as QP-300, available from Dow Chemical Co.; bentonite clay derivatives, such as Bentone® SD2, available from Elements Specialties, Inc. of East Windsor, N.J.; nonionic urethane rheology modifiers, such as Acrysol® RM-825, available from Dow Chemical Co.; and combinations thereof.

In an alternative embodiment, the icephobic coating composition can include about 1% to about 20% by weight solution polymer instead of the latex polymer. The solution polymer can be almost any polymer that is soluble in VOC-exempt solvents. "VOC-exempt" solvents are volatile organic solvents that are exempt from EPA regulation because they have negligible reactivity and have been found not to contribute appreciably to ozone formation. Examples of suitable solid polymers include without limitation acrylics, nitrocellulose, alkyds, cellulose acetate butyrate, styrene-ethylene/butylene copolymers, polystyrene, and combinations thereof. The solution polymer may suitably present at about 1% to about 10% by weight.

This alternative embodiment may also include about 30 to about 70% by weight, suitably about 40% to about 60% by weight of an inorganic halide salt as described above. This icephobic coating composition also includes about 10% to about 40% by weight, suitably about 15% to about 30% by weight of a VOC-exempt solvent. Suitable VOC-exempt solvents include acetone, parachlorobenzotrifluoride, and combinations thereof. This icephobic coating composition may also include about 0.25% to about 5% by weight of a rheology modifier as described above.

The icephobic coating composition can be prepared by adding and mixing the ingredients together in the stated amounts until uniformity is achieved. Any suitable batch or continuous mixer can be used, and mixing can be accomplished at room temperature.

The icephobic coating composition can be applied to surface by pouring, spraying, coating, or any suitable technique. The surface can be formed of asphalt, concrete, wood, metal, wool/plastic composite, or any common outdoor material. In order to maintain the ingredients in the desired proportions, the surface should preferably be dry when the icephobic coating composition is applied. The icephobic coating composition can also be applied to a wet surface, with the understanding that the presence of additional water may cause unwanted dilution.

Once the icephobic coating composition is applied to a surface, the composition can be permitted to dry, yielding an icephobic coating layer. While complete drying may not be feasible due to uncontrolled weather, a dried coating layer will have enhanced durability compared to a wet composition. Once the coating composition is dried, the icephobic coating layer will melt snow and ice, prevent the formation of ice, and/or facilitate the easy removal of snow and ice for an extended period of time encompassing multiple winter weather events. The durable life of the icephobic coating layer depends on several factors, including whether or not the layer was permitted to dry after application, the frequency and severity of the winter weather events, and the amount of traffic, shoveling, and plowing that the coating layer endures. In any case, the icephobic coating layer avoids the splashing and soiling associated with the use of common granular salts, and avoids the frequent application required of granular salts.

EXAMPLES

Example 1

The following water-based icephobic coating composition can be prepared by mixing the ingredients together in the stated amounts, at room temperature.

| Raw Material | Wt. % |
| --- | --- |
| Inorganic Halide Salt | 55 |
| Water | 32.8 |
| Alberdingk AC 75070 water-based polyurethane and acrylate latex | 10 |
| Triton X405 surfactant | 1 |
| Dimethylethanolamine | 0.5 |
| Cellosize ™ QP-300 hydroxycellulose thickener | 0.5 |
| TEGO ® Airex 900 defoamer | 0.2 |

Example 2

The following solvent-based icephobic coating composition can be prepared by mixing the ingredients together in the stated amounts, at room temperature.

| Raw Material | Wt. % |
| --- | --- |
| Paraloid ® B66 acrylic polymer | 4 |
| Acetone | 15 |
| Parachlorobenzotrifluoride | 15 |
| Bentone SD2 rheology modifier | 1 |
| Inorganic Halide Salt | 65 |

Example 3

Figure 2:
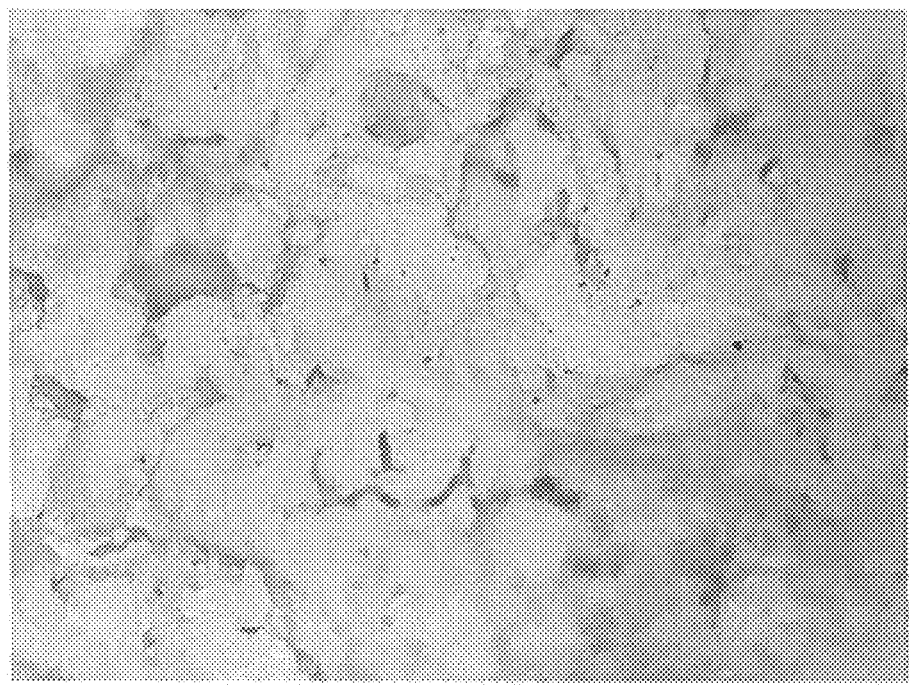
FIG. 2 is a photomicrograph of the icephobic coating composition of FIG. 1, after ice has been applied and melted, causing depletion of the salt (100× magnification).

Using sodium chloride as a non-hygroscopic inorganic halide salt in the icephobic coating composition of Example 1, a 20-mil (508-micron) coating was applied to a 12"×12" (30.5 mm×30.5 mm) concrete panel and allowed to dry for 24 hours in a freezer chamber at 10° F. (−12° C.). FIG. 1 shows the morphology of the dried coating at 100× magnification. A circular ice puck having a diameter of 4" (10 mm) and a thickness of 2" (5 mm) was then placed on top of the coating and monitored at 10° F. (−12° C.). The ice melted completely after a time period of 24 hours. The melting of the ice also degraded the coating by consuming the salt in the vicinity of the melting ice. This degradation left behind a brittle polymer matrix that is easily removed, either manually or through natural weathering. FIG. 2 shows the morphology of the degraded coating at 100× magnification.

Example 4

Figure 3:
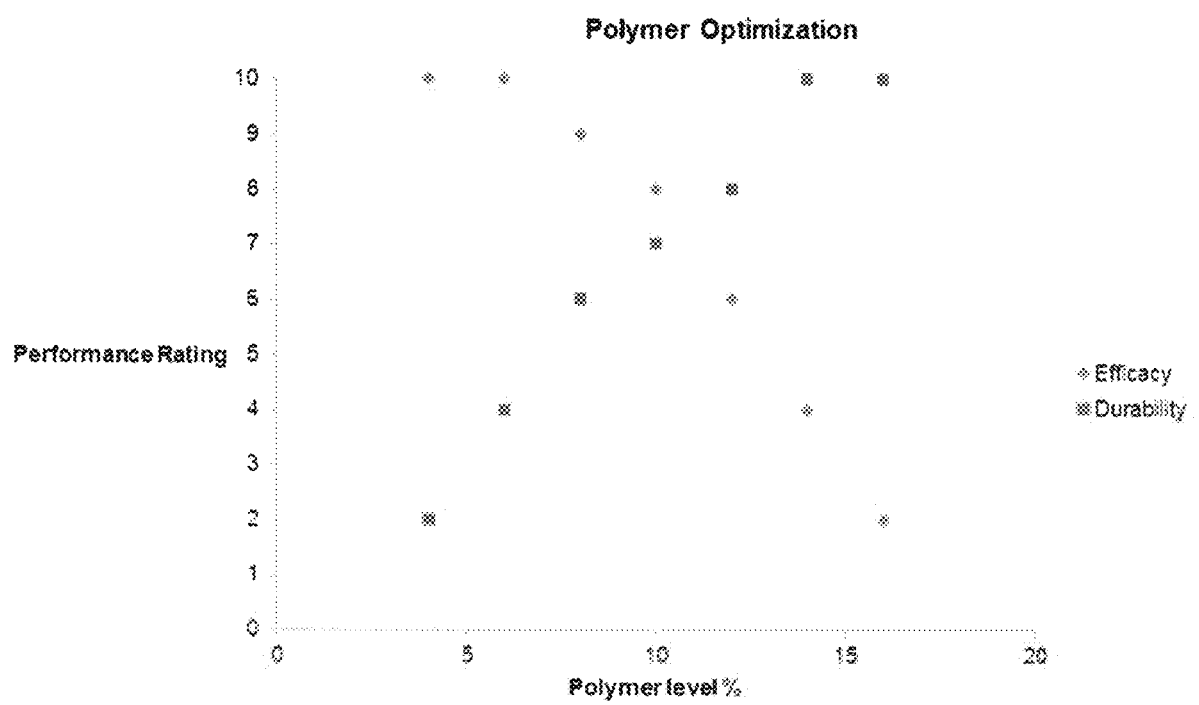
FIG. 3 is a qualitative plot of coating efficacy and durability, as a function of polymer content in the icephobic coating composition.

The icephobic coating composition of Example 3 was modified using a constant 50% level of sodium chloride salt and by varying the level of the latex at 4%, 6%, 8%, 10%, 12%, 14%, and 16% by weight, respectively. For each of the compositions, the performance rating (efficacy in melting the ice puck) and the durability of the coating before and after melting the ice were evaluated on a scale of 1 to 10. FIG. 3 shows the plots of efficacy and durability as a function of the latex percentage. Lower levels of latex correlate with higher efficacy in melting the ice, whereas higher levels of latex correlate with higher levels of coating durability. However, excessive coating durability can be just as undesirable as having lite or no durability, because the degraded coating is not easily removed. The optional latex percentage was determined to be about 10% by weight, because efficacy in melting the ice was relatively high (7 on a sale of 10) and coating durability (also 7 on a scale of 10) was reasonably high, but not too high.

Example 5

Figure 4:
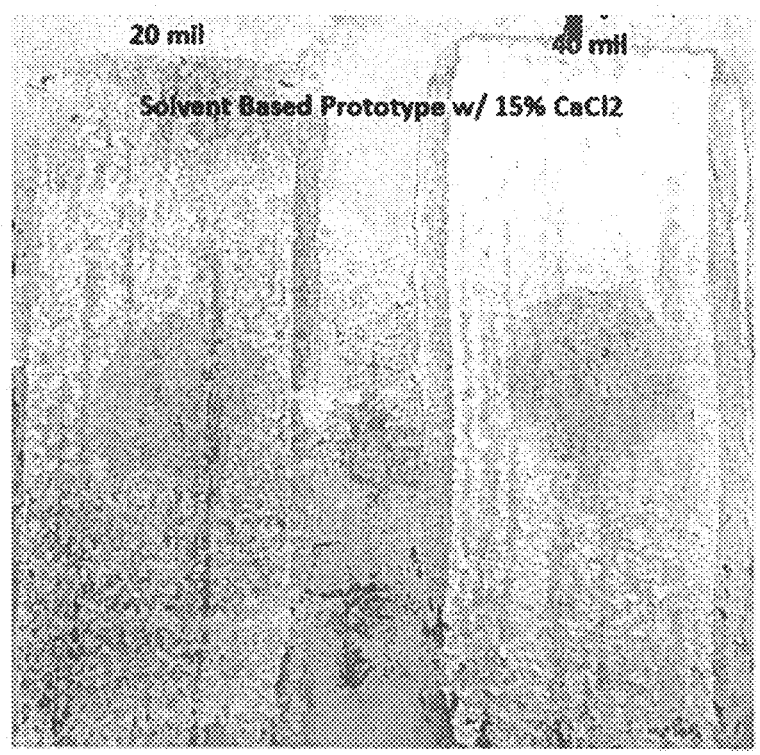
FIG. 4 is a photomicrograph of an icephobic coating composition that includes a hygroscopic salt component, applied to a surface and partially degraded (100× magnification)

Hygroscopic inorganic halide salts were found to be less desirable than non-hygroscopic inorganic halide salts in the icephobic coating composition of the invention. This is because hygroscopic inorganic halide salts absorb moisture from the air spontaneously, either during storage or after the icephobic coating composition is applied to a surface (and before the coating is exposed to snow or ice). This spontaneous absorption by the salt leaves the icephobic coating partially degraded and less efficacious even before the coating is exposed to snow or ice. FIG. 4 shows the morphology (magnified 100×) of a partially degraded icephobic coating that contains 15% by weight calcium chloride, prior to being exposed to any snow or ice.

Example 6

Figure 5:
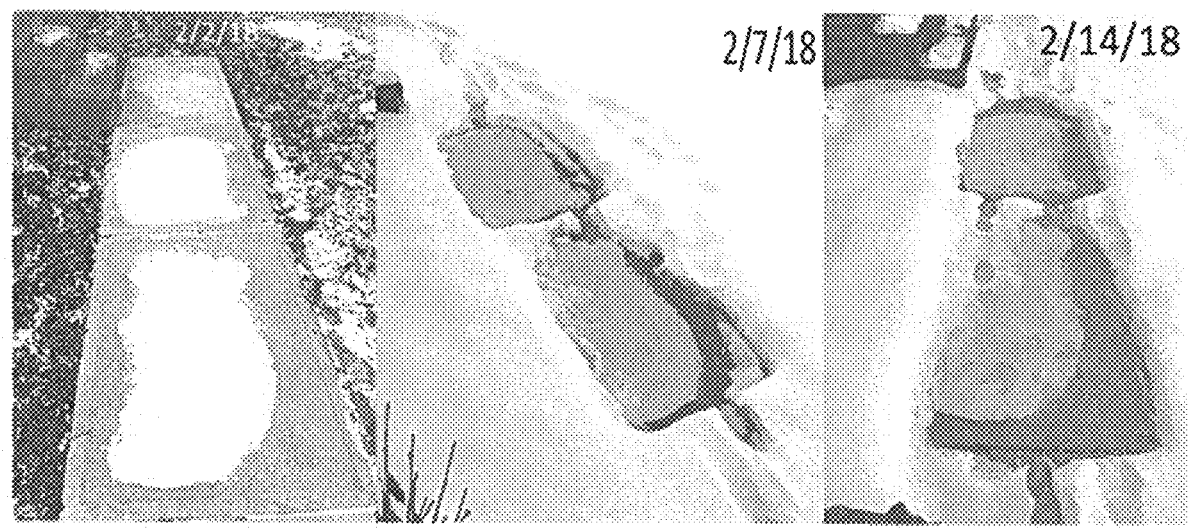
FIG. 5 shows an icephobic coating composition of the invention a) applied to an outdoor concrete surface and dried, b) five days later, following a first snow, and c) another seven days later, following a second snow.

The icephobic coating composition of Example 3 was coated to a thickness of 20 mils (508 microns) on an outdoor concrete testing surface as shown in FIG. 5, left hand photo. Only portions of the surface were covered, as shown by the white patches. Within five days, snow had fallen as shown in FIG. 5, middle photo, and the snow had melted away from the coated portions of the surface. Within another seven days (twelve days from the start), more snow had fallen as shown in FIG. 5, right hand photo. Again, the snow had melted away from the coated portions of the surface, and the immediately surrounding areas.

While the embodiments of the invention disclosed herein are exemplary, various modifications and improvements can be made without departing from the spirit and scope of the invention. The scope of the invention is indicated by the appended claims, and all changes that fall within the meaning and range of equivalents are intended to be embraced therein.

I claim:
1. An icephobic coating composition, comprising:
about 2.5% to about 12.5% by weight of latex polymer solids;

about 30% to about 70% by weight of an inorganic halide salt, the inorganic halide salt being at least partially dissolved in the icephobic coating composition;
about 15% to about 50% by weight water;
optionally, about 1% to about 15% by weight of an organic co-solvent selected from the group consisting of glycerin, glycol, glycol ethers and combinations thereof; and
optionally, about 1% to about 5% by weight additives selected from the group consisting of defoamers, surfactants, rheology modifiers, and combinations thereof.

2. The icephobic coating composition of claim 1, wherein the latex polymer comprises an isoprene polymer.

3. The icephobic coating composition of claim 1, wherein the latex polymer comprises a synthetic latex polymer selected from the group consisting of latex acrylic polymers, polybutadienes, styrene-butadiene copolymers, polyvinyl acetate, vinyl copolymers, polyurethanes, polychloroprenes, polystyrenes, polymethyl methacrylate, and combinations thereof.

4. The icephobic coating composition of claim 1, wherein the latex polymer solids are present at about 5% to about 10% by weight.

5. The icephobic coating composition of claim 1, wherein the water is present at about 20% to about 40% by weight.

6. The icephobic coating composition of claim 1, wherein the inorganic halide salt is selected from the group consisting of inorganic halide salts of sodium, potassium, magnesium, calcium, and combinations thereof.

7. The icephobic coating composition of claim 1, wherein the inorganic halide salt is non-hygroscopic.

8. The icephobic coating composition of claim 7, wherein the inorganic halide salt is selected from the group consisting of sodium chloride, potassium chloride, and combinations thereof.

9. The icephobic coating composition of claim 1, wherein the inorganic halide salt is present at about 40% to about 60% by weight.

10. The icephobic coating composition of claim 1, wherein the organic co-solvent comprises a glycol selected from the group consisting of ethylene glycol, propylene glycol, butylene glycol, and combinations thereof.

11. The icephobic coating composition of claim 1, wherein the organic co-solvent comprises a glycol ether selected from the group consisting of alkyl ethers of ethylene glycol, propylene glycol, butylene glycol, and combinations thereof.

12. The icephobic coating composition of claim 1, wherein the organic co-solvent comprises glycerin.

13. The icephobic coating composition of claim 1, wherein the organic co-solvent is present at about 2% to about 10% by weight.

14. An icephobic coating composition, comprising:
about 2.5% to about 12.5% by weight of latex polymer solids;
about 40% to about 60% by weight of an inorganic halide salt, the inorganic halide salt being at least partially dissolved in the icephobic coating composition;
about 20% to about 40% by weight water;
about 2% to about 10% by weight of an organic co-solvent selected from the group consisting of glycerin, glycols, glycol ethers and combinations thereof; and
optionally, about 1% to about 5% by weight additives selected from the group consisting of defoamers, rheology modifiers, and combinations thereof.

15. The icephobic coating composition of claim 14, wherein the latex polymer comprises an isoprene polymer.

16. The icephobic coating composition of claim 14, wherein the latex polymer comprises a synthetic latex polymer selected from the group consisting of latex acrylic polymers, polybutadienes, styrene-butadiene copolymers, polyvinyl acetate, vinyl copolymers, polyurethanes, polychloroprenes, polystyrenes, polymethyl methacrylate, and combinations thereof.

17. The icephobic coating composition of claim 14, wherein the inorganic halide salt is selected from the group consisting of halide salts of sodium, potassium, magnesium, calcium, and combinations thereof.

18. The icephobic coating composition of claim 17, wherein the inorganic halide salt is selected from the group consisting of sodium, potassium, and combinations thereof.

19. The icephobic coating composition of claim 14, wherein the organic co-solvent comprises a glycol selected from the group consisting of ethylene glycol, propylene glycol, butylene glycol, and combinations thereof.

20. The icephobic coating composition of claim 14, wherein the organic co-solvent comprises a glycol ether selected from the group consisting of alkyl ethers of ethylene glycol, propylene glycol, butylene glycol, and combinations thereof.

21. The icephobic coating composition of claim 14, wherein the organic co-solvent comprises glycerin.

22. A method of preparing an icephobic coating layer, comprising the steps of:
providing an icephobic composition that includes about 2.5% to about 12.5% by weight of latex polymer solids, about 30% to about 70% by weight of an inorganic halide salt, about 15% to about 50% by weight water and about 1% to about 15% by weight of an organic co-solvent selected from glycerin, glycols, and glycol ethers wherein the inorganic halide salt is at least partially dissolved in the icephobic coating composition;
applying the icephobic composition to a surface; and
drying the icephobic composition on the surface to form an icephobic coating layer.

23. An icephobic coating composition, comprising:
about 1% to about 20% by weight of a solution polymer selected from acrylics, nitrocellulose, alkyds, cellulose acetate butyrate, styrene-ethylene/butylene copolymers, polystyrene, and combinations thereof;
about 30% to about 70% by weight of an inorganic halide salt, the inorganic halide salt being at least partially dissolved in the icephobic coating composition;
about 10% to about 40% by weight of a solvent selected from acetone, parachlorobenzotrifluoride, and combinations thereof; and
optionally, about 0.25% to about 5% by weight additives selected from rheology modifiers.

24. The icephobic composition of claim 23, wherein the inorganic halide salt is non-hygroscopic.

25. A method of preparing an icephobic coating layer, comprising the steps of:
providing an icephobic composition that includes about 1% to about 20% by weight of a solution polymer, about 30% to about 70% by weight of an inorganic halide salt, and about 10% to about 40% by weight of a solvent selected from acetone, parachlorobenzotrifluoride, and combinations thereof,
wherein the inorganic halide salt is at least partially dissolved in the icephobic coating composition;
applying the icephobic composition to a surface; and drying the icephobic composition on the surface to form an icephobic coating layer.

* * * * *